United States Patent
Yager et al.

(10) Patent No.: US 7,523,227 B1
(45) Date of Patent: Apr. 21, 2009

(54) INTERCHANGEABLE STANDARD PORT OR STACK PORT

(75) Inventors: Charles T. Yager, Cupertino, CA (US); Surendra Anubolu, Fremont, CA (US); Sandeep Arvind Patel, Los Gatos, CA (US); Paul Booth, Campbell, CA (US); Amar C. Amar, Fremont, CA (US); Bradley D. Erickson, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1187 days.

(21) Appl. No.: 10/345,435

(22) Filed: Jan. 14, 2003

(51) Int. Cl.
*G06F 13/28* (2006.01)

(52) U.S. Cl. .......................... 710/16; 709/233; 370/232

(58) Field of Classification Search .................. 710/16; 709/233
See application file for complete search history.

(56) References Cited

U.S. PATENT DOCUMENTS

| | | | | |
|---|---|---|---|---|
| 4,972,470 | A * | 11/1990 | Farago | 713/192 |
| 5,596,575 | A * | 1/1997 | Yang et al. | 370/468 |
| 5,754,552 | A * | 5/1998 | Allmond et al. | 370/465 |
| 6,430,633 | B1 | 8/2002 | Voloshin | |
| 6,431,765 | B1 | 8/2002 | Chen et al. | |
| 2001/0032283 | A1* | 10/2001 | Chen et al. | 710/200 |
| 2003/0021580 | A1* | 1/2003 | Matthews | 385/147 |

OTHER PUBLICATIONS

1) Agilent Technologies, Agilent HFBR-5720L/5720LP Small Form Pluggable Low Voltage (3.3 V) Optical Transceiver, Aug. 20, 2001, Agilent Technologies Inc., 2) Netgear, 16 Port 10/100/1000 Gigabit Switch GS516T, Nov. 2001, Netgear.*
3) 3COM, SuperStack 3 Switch 4900 Series GBIC Module (3C17714) User Guide, May 2001, 3COM 4) ICS Advent, DES 1009G 8-Port 10/100 Mbps Auto-Negotiation w/Gigabit Copper Uplink Switch, Dec. 2001, ICS Advent.*
5) D-Link, D-Link Expands Ethernet Line With New Gigabit Over Copper Switch, Apr. 17, 2001, D-link http://www.dlink.com/press/pr/?prid=67.*
6) MiLAN Technologies, MIL-SM801xx Managed 9 Port Switch User Guide, 2001, MiLAN Technologies, Inc.*
Agilent Technologies, Agilent HFBR-5720L/5720LP Small Form Pluggable Low Voltage (3.3 V) Optical Transceiver, Aug. 20, 2001, Agilent Technologies Inc.*
Netgear, 16 Port 10/100/1000 Gigabit Switch GS516T, Nov. 2001, Netgear.*

(Continued)

*Primary Examiner*—Henry W. H. Tsai
*Assistant Examiner*—Elias Mamo
(74) *Attorney, Agent, or Firm*—Charles E. Krueger

(57) ABSTRACT

An Interchangeable Standard Port or Stack Port (ISPSP) uses a standard physical connector such as an RJ-45 or SFP. The ISPSP automatically detects whether it is connected to a standard port, such as a 1000BaseT, or whether it is connected to another ISPSP stacking port. This automatic detection can be done through hardware or software. Once the auto-detection is complete the routing platform will automatically configure the ISPSP port for standard 1 Gbps bit rate and framing, or for stacking, e.g., 2.5 Gbps bit rate, and framing.

11 Claims, 4 Drawing Sheets

OTHER PUBLICATIONS

3COM, SuperStack 3 Switch 4900 Series GBIC Module (3C17714) User Guide, May 2001, 3COM.*

ICS Advent, DES 1009G 8-Port 10/100 Mbps Auto-Negotiation w/Gigabit Copper Uplink Switch, Dec. 2001, ICS Advent.*

D-Link, D-Link Expands Ethernet Line With New Gigabit Over Copper Switch, Apr. 17, 2001, D- link http://www, dlink. com|press|prl?prid=670.*

Milan Technologies, MIL-SM801xx Managed 9 Port Switch User Guide, 2001, Milan Technologies, Inc.*

Cisco Systems, Inc., "Data Sheet: GigaStack GBIC", copyright 1992-2000, posted Oct. 3, 2000, retrieved from the Internet on Jul. 25, 2002: <URL:http://www.cisco.com/warp/public/cc/pd/si/casi/ca3500xl/prodlit/gbic_ds.htm>.

* cited by examiner

INTERCHANGEABLE STANDARD PORT OR STACK PORT

BACKGROUND OF THE INVENTION

In a fixed Ethernet Switch, stacking busses are becoming a popular means to interconnect switches that are physically stacked on top of each other. The stacking bus serves as a higher performance and lower cost way to interconnect fixed Ethernet Switches than using a standard interface.

Prior implementations of stacking buses include either dedicated stack ports on the fixed switch, or, in the case of, for example, the GigaStack bus, manufactured by the assignee of the present application, a module that plugs into a standard GBIC port.

However, each implementation has disadvantages. The use of dedicated stack ports consumes valuable space on a rack or box that cannot be used for network ports. The use of modules adds cost, may take up additional space, and requires that the modules be available when a stack is required, which is not always the case.

BRIEF SUMMARY OF THE INVENTION

In one embodiment of the invention, an "Interchangeable Standard Port or Stack Port" (ISPSP) approach uses a standard connector, such as an SFP or RJ-45 connector to connect to either another stack port or a standard port such as a fiber uplink or copper desktop port. A special cable may be required to transmit data at the higher stacking data transfer rate.

In another embodiment of the invention, ISPSP automatically detects whether it is connected to a standard uplink or desktop port, or a stack port.

In another embodiment of the invention, after the auto-detection the routing platform automatically adjusts the bit rate of the port. If the ISPSP is connected to a standard port such as 1000BaseT or Fiber SFP Uplink, the bit rate will be the standard bit rate of, for example, 1 Gbps. If the ISPSP stacking port is connected to another ISPSP stacking port then the bit rate will be a higher stacking bit rate of, for example, 2.5 Gbps.

In another embodiment of the invention, routing platforms connected by through an ISPSP port auto-negotiate to determine a stacking data transfer rate sustainable by both platforms and the interconnection.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The invention will now be described with reference to various embodiments implemented in a routing platform. In the following, the term routing platform is utilized broadly to include any component such a router, bridge, switch, layer 2 or layer 3 switch, gateway, etc., that refers to components utilized to implement connectivity within a network or between networks.

An overview of an embodiment of the invention will now be provided. The ISPSP uses a standard physical connector such as an RJ-45 or SFP. The ISPSP automatically detects whether it is connected to a standard port, such as a 1000BaseT, or whether it is connected to another ISPSP stacking port. This automatic detection can be done through hardware or software. Once the auto-detection is complete the routing platform will automatically configure the ISPSP port for standard 1 Gbps bit rate and framing, or for stacking 2.5 Gbps bit rate or higher and framing.

Figure 1:
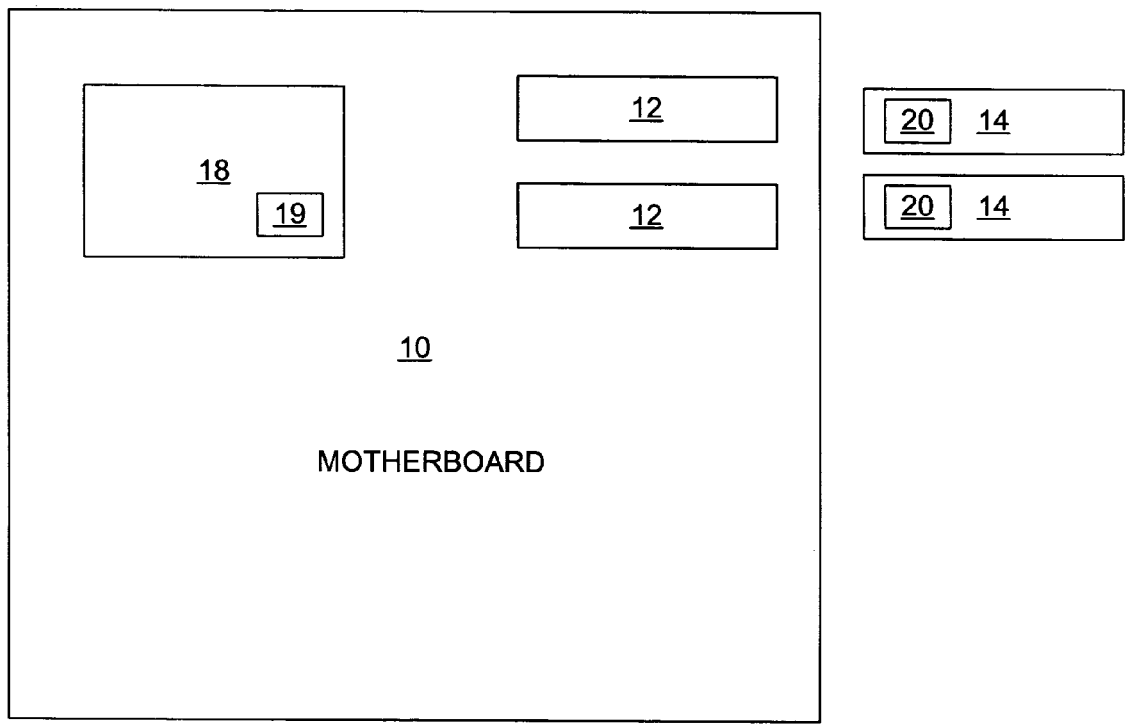
FIG. 1 is a block diagram of a routing platform motherboard.

FIG. 1 depicts a motherboard included in a routing platform which implements an embodiment of the present invention. In FIG. 1 the motherboard 10 includes a number of SFP (Small Form-factor Pluggable) cages 12 for receiving SFP modules 14 which are GBIC (Gigabit Interface Converter) transceivers that plug into a Gigabit Ethernet module, linking the module with the fiber-optic network. The SFP cages 12 are coupled to a control ASIC (Application Specific Integrated Circuit) 18 having memory 19 for holding program code.

In this embodiment, each SFP module 14 includes a serial EEPROM 20 that includes information about the capabilities of the SFP module 14 plugged into a cage 12. The control ASIC program code reads the serial EEPROM 20 to detect whether an SFP module 14 is a standard SFP module for connecting to the network or an ISPSP module used for forming a stack connecting with other routing platforms.

If the control ASIC determines that a standard SFP module, for example a 1000BaseT module, has been plugged into the ISPSP then the port will be treated as a standard network port for receiving and transmitting packets to the network connected to the port.

If, on the other hand, the control ASIC detects that a stacking SFP module has been plugged into the ISPSP then the control ASIC will utilize the port as a stacking port to transmit received packets with destination ports on another routing platform and to receive incoming packets received at other routing platforms in the stack that are to be transmitted from ports on this routing platform.

In an another embodiment, the lack of a serial EEPROM in an SFP module and the fact that a link can be established with another device in the stack confirms a stacking link. Alternatively, once a link is established packets can be exchanged between the devices to establish that a stacking mode link is configured.

The speed of an ISPSP link will depend on the type of fiber utilized, the length of the fiber, and the capabilities of the routing platform. In one embodiment, subsequent to detection of an ISPSP stacking link between two routing platforms the routing platform control ASICs auto-negotiate to determine the maximum data transfer rate on the link thereby allowing backward compatibility with previous generation legacy products. For example, a new generation of routing platforms having the capability to transfer data at 5 Gbps may be stacked with another legacy routing platform having the capability to transfer data at only 2.5 Gbps. In this case the routing platforms would auto-negotiate to a data transfer rate of 2.5 Gbps.

Figure 2:
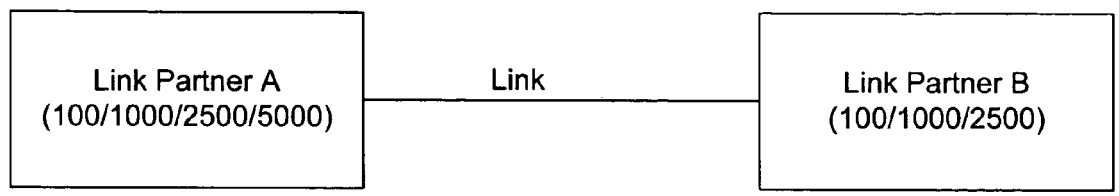
FIG. 2 depicts a link between two stations operating a different data transfer rates.
Figure 3:
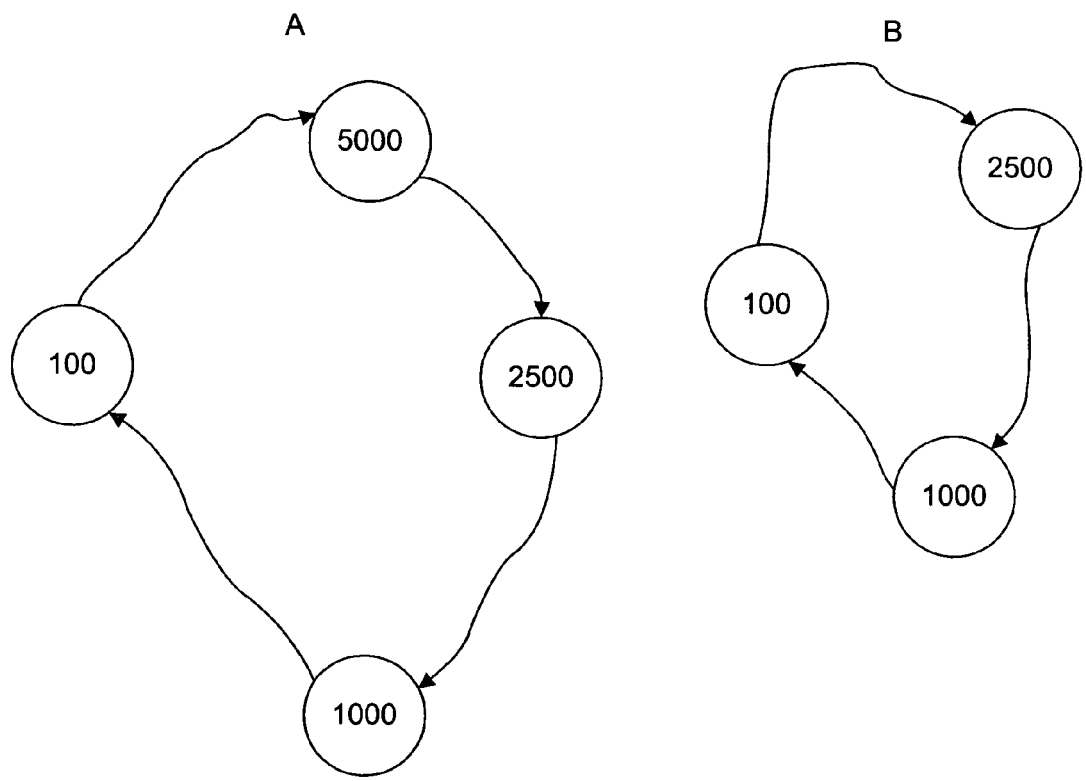
FIG. 3 is a state diagram depicting a protocol for auto-negotiating a stacking data transfer rate.

A first embodiment of an auto negotiation protocol will now be described with reference to FIGS. 2 and 3. Referring to FIG. 2, a link is established between Station A and Station B where Station A can transfer data at 100, 1000, 2500, or 5000 Mbps and Station B can transfer data at 100, 1000, or 2500 Mbps. As depicted in FIG. 3, each station tries to connect to the other station, if not successful, it will wait for random amount of time and tries the next possible speed and so on. So if the average amount of time each speed is tried is 10 ms, then the above algorithm would allow both stations to connect in about 120 ms on average. This is because there are four possible speeds for Station A and 3 possible values for station B.

Once the connection is made software running at both the sides will exchange information to get the list of speeds supported by its partner and establish the highest possible speed.

In an alternative embodiment, if the minimum data transfer rate is known, then a link is established at the lowest possible data transfer rate, information is exchanged on the capabilities of each station, and then the connection is re-established at the highest sustainable data transfer rate. This process can be more stable.

In the above example, whenever the link is lost, both stations fall back to 100 Mbps operation and continuously try to establish a link. When both are connected, they will exchange information at the 100 Mbps rate and figure that they can up the speed to 2500 Mbps. They will then restart the links at higher speed. This will complete the process.

Figure 4:
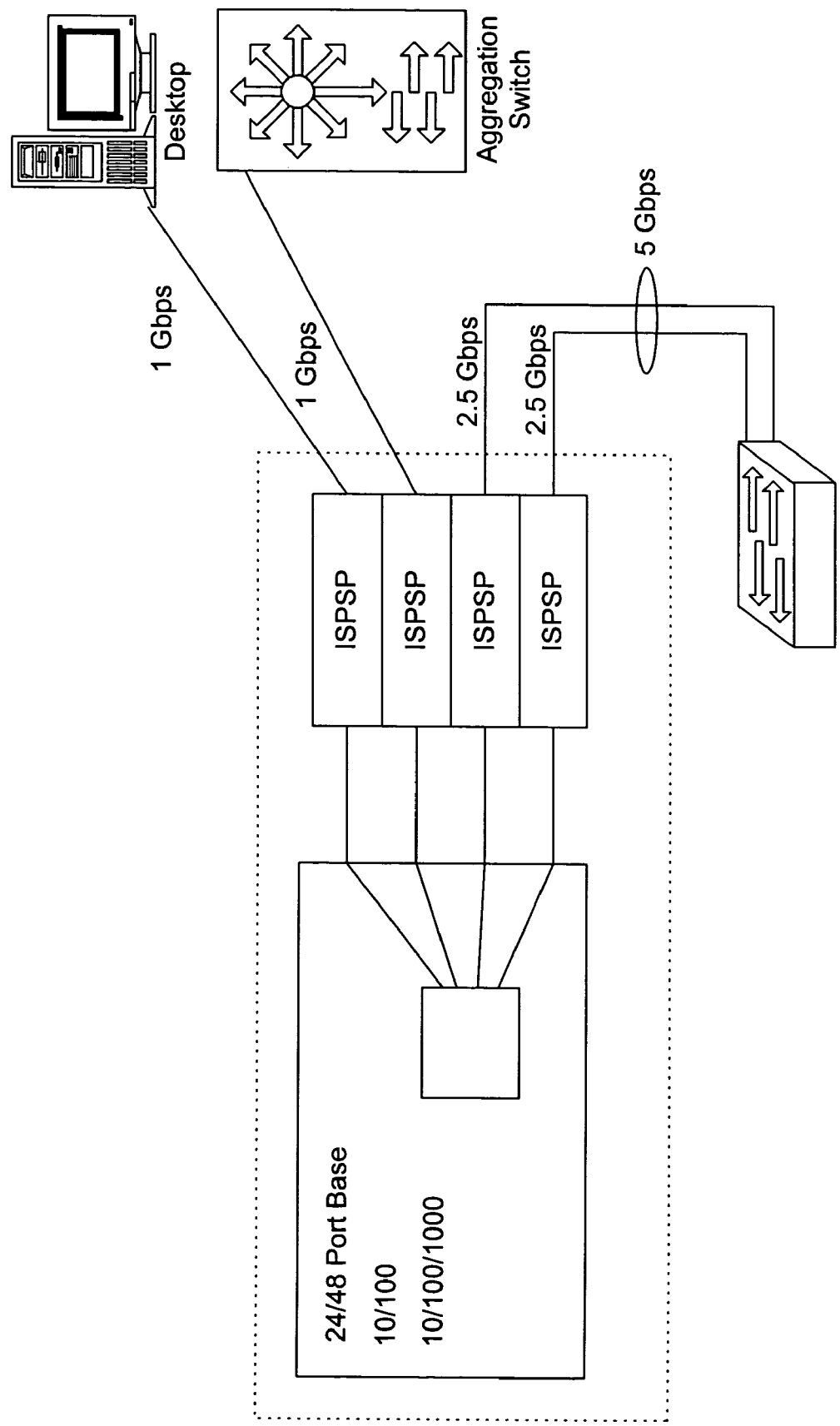
FIG. 4 is a block diagram of an embodiment of the invention having four ISPSPs.
Figure 5C:
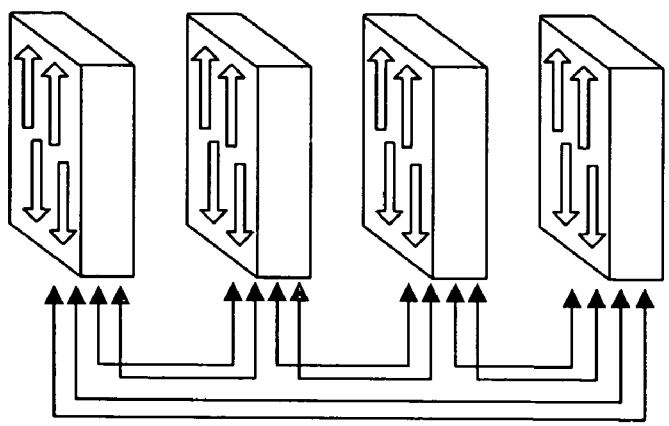
FIGS. 5A, B, and C are block diagrams depicting different stack configurations utilizing an embodiment of the invention.
Figure 5B:
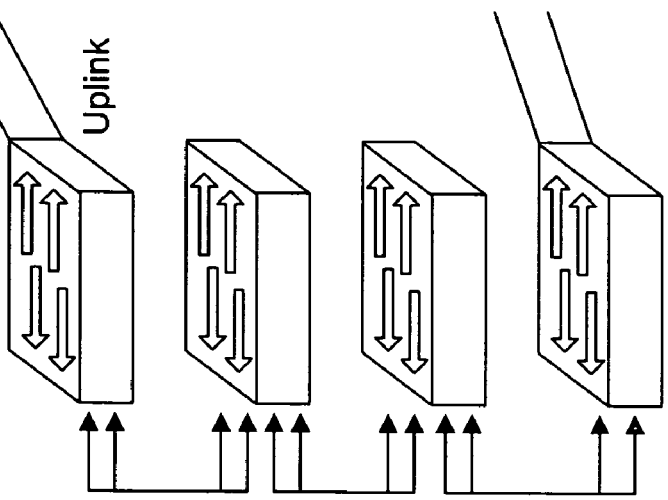
Figure 5A:
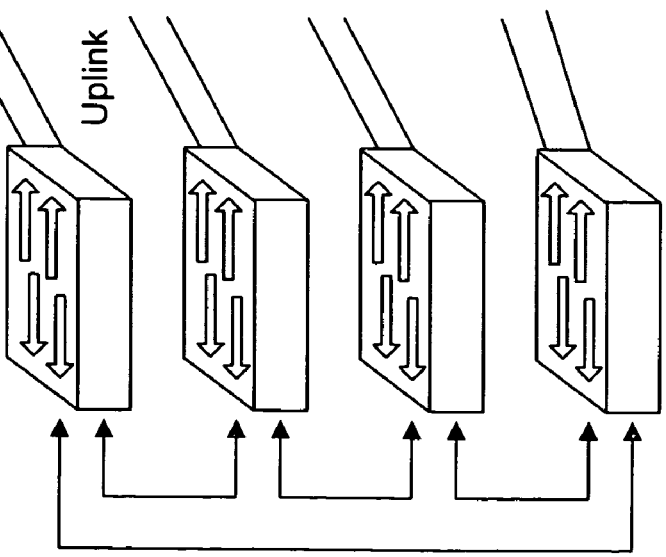

The flexibility of the described embodiment is demonstrated by the various configurations depicted in FIG. 4 and FIGS. 5A, B, and C. FIG. 4 depicts a routing platform having 4 ISPSP ports with two of the ports configured as standard Gigabit Ethernet ports connected to, respectively, an desktop workstation and an uplink to an aggregation switch. The two remaining ports are each configured as 2.5 Gbps stacking ports to form a 5 Gbps stacking link with another routing platform. If all 4 of the ISPSP ports were configured as stacking links than a 20 Gbps full duplex stacking bus would be formed.

FIGS. 5A, B, and C further illustrate the versatility showing different stacking configurations of four routing platforms. FIG. 5A depicts a fully fault tolerant routing platform for use in a wiring closet. A single 2.5 Gbps stacking link is formed between each routing platform with the end routing platforms connected by a loopback link. Thus, if any stacking link were interrupted the routing platforms could still communicate using the loopback link.

FIG. 5B depicts a fault tolerant configuration with two stacking links between each routing platform to form a 5 Gbps stacking bus. If both the links between a pair of routing platforms were interrupted the uplinks could be used to communicate between the top and bottom routing platforms of the stack.

FIG. 5C depicts a fully fault tolerant Data Center/Backbone configuration with two stacking links between each routing platform to form a 5 Gbps stacking bus and two links used to form a loopback connection between the top and bottom routing platforms in the stack for full fault tolerance.

Thus a system has been described that saves the cost and real estate of using dedicated ports on a routing platform. Current solutions use dedicated stack ports and uplink/desktop ports. Since the ISPSP is dual purpose it replaces two ports with one port. Standard connectors are utilized and very high data transfer rates are enabled.

The invention may be implemented as program code, stored on a computer readable medium, that is executed by a controller to control the routing platform to perform the various function described above. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. For example, the above described embodiment utilizes an SFP connectors, but other connectors known in the art can be utilized such as standard GBIC connectors, DCE and DTE connectors. Additionally, a general purpose processor instead of an control ASIC may be utilized or the entire motherboard of FIG. 1 may be implemented as an ASIC. Further, the auto-detection system can utilize hardware sensing techniques known in the art. Accordingly, it is not intended to limit the invention except as provided by the appended claims.

What is claimed is:

1. An apparatus comprising:
    a standard port on a first routing platform, with the standard port adapted to receive a standard connector including a memory device holding identification information that indicates whether the standard connector is a standard network connector operating at a standard network rate or a stacking connector, utilized to form a stack connection with other routing platforms in a stack, operating at a higher rate; and
    a controller, coupled to the standard port, adapted to read the identification information from the memory device of a standard connector plugged into the standard port to detect whether the standard connector is a stacking connector configured to transfer data through the standard port at the higher rate or whether the standard connector is a standard network connector configured to transfer data at the slower network rate; and
    with the controller further adapted to either utilize the standard port on the first routing platform as a standard network port configured to receive and transmit packets to a network connected to the first standard port if the controller detects that the standard connector is a standard network connector or to utilize the standard port as a stack port configured to be connected a second routing platform in the stack if the controller determines that the standard connector is a stacking connector.

2. The apparatus of claim 1 wherein the memory device comprises:
    a memory chip having identification information stored therein.

3. The apparatus of claim 1 wherein:
    the controller auto-negotiates with the second routing platform in the stack connected to the standard port to determine a maximum data rate for transferring data with the second routing platform.

4. A method comprising:
    reading identification information from a memory device, included on a standard connector coupled to a standard port of a first routing platform, to determine whether the standard connector is a network connector or a stacking connector utilized to form a stack connection with at least a second routing platform in a stack;

if the standard connector is determined to be a stacking connector, utilizing the standard port as a stack port to exchange data at a high data rate through the standard port with the second routing platform in the stack connected to the standard port; and if the standard connector is determined to be a network connector, utilizing the standard port as a standard network port configured to receive and transmit packets to a network connected to the first standard port.

5. The method of claim 4 further comprising the step of:

auto-negotiating with the second routing platform in the stack to determine a data transfer rate sustainable by both the first and the second routing platform.

6. The method of claim 4 where the memory device is a memory chip having identification information stored thereon, and where the step of utilizing the memory device further comprises the step of:

reading the identification information from the memory chip to determine whether the standard connector is standard network connector or a stacking connector.

7. The method of claim 4 where the memory device is a memory chip having identification information stored thereon, and where the step of utilizing the memory device further comprises the step of:

detecting the presence or absence of the memory chip in the connector to determine whether the standard connector is a standard network connector or a stacking connector.

8. A system comprising:

means for reading a memory device, included on a standard connector coupled to a standard port of a first routing platform, to determine whether the standard connector is a network connector or a stacking connector utilized to form a stack connection with other routing platforms in a stack;

means for utilizing the standard port to exchange data at a high data rate with a second routing platform in the stack connected to the standard port if the standard connector is determined to be a stacking connector; and means for utilizing the standard port as a standard network port configured to receive and transmit packets to a network connected to the first standard port if the standard connector is determined to be a network connector.

9. The system of claim 8 further comprising:

means for auto-negotiating with the second routing platform in the stack to determine a data transfer rate sustainable by both the first and the second routing platforms.

10. The system of claim 8 where the memory device is a memory chip having identification information stored thereon, and where the means for utilizing the memory device further comprises:

means for reading the identification information from the memory chip to determine whether the standard connector is a standard network connector or a stacking connector.

11. The apparatus of claim 1 where the controller is configured to transfer data at a first plurality of data transfer rates, where the second routing platform in the stack configured to transfer data at a second plurality of data transfer rates, and wherein:

the controller of the first routing platform is configured to attempt to connect to the second routing platform at a first data rate in the respective plurality of data transfer rates in the first plurality and, if not successful, to attempt to connect at a next possible data transfer rate and successive data rates until a connection is established.

* * * * *